United States Patent [19]
Isfort et al.

[11] Patent Number: 6,029,430
[45] Date of Patent: Feb. 29, 2000

[54] DEVICE FOR EXTRACTING FOREIGN OBJECTS FROM FORAGER HARVESTERS

[75] Inventors: Heinrich Isfort, Dülmen; Karl Landwehr, Hagen a.T.W., both of Germany

[73] Assignee: Claas Selbstfahrende Erntemaschinen GmbH, Harsewinkel, Germany

[21] Appl. No.: 09/163,837

[22] Filed: Sep. 30, 1998

[30] Foreign Application Priority Data

Sep. 29, 1997 [DE] Germany .................. 197 42 846

[51] Int. Cl.⁷ ..................................... A01F 12/54
[52] U.S. Cl. .................. 56/12.8; 56/13.3; 55/269; 180/68.6
[58] Field of Search ................ 56/12.8, 13.3; 55/269, 290; 180/68.1, 68.2, 68.6

[56] References Cited

U.S. PATENT DOCUMENTS

| 3,837,149 | 9/1974 | West et al. ........................ 55/282.5 |
| 5,595,537 | 1/1997 | Jungemann et al. .................. 460/100 |

FOREIGN PATENT DOCUMENTS

| 03 13 763 A1 | 8/1988 | European Pat. Off. ......... F01P 11/12 |
| 0 481 203 | 9/1991 | European Pat. Off. ......... F01P 11/12 |
| 04 81 203 A1 | 9/1991 | European Pat. Off. ......... F01P 11/12 |
| 24 18 054 B2 | 1/1975 | Germany ..................... F01P 11/12 |
| 40 33 204 A1 | 4/1992 | Germany ..................... A01D 69/00 |
| 195 47 348 C2 | 7/1997 | Germany ..................... A01D 43/08 |
| 44 04 401 A1 | 8/1998 | Germany ..................... A01D 69/00 |

OTHER PUBLICATIONS

JP 5–146214 A., In: Patents Abstracts of Japan, C–1113, Sep. 21, 1993, vol. 17, No. 523.

*Primary Examiner*—James A. Lisehora
*Attorney, Agent, or Firm*—Husch & Eppenberger, LLC; Robert E. Muir

[57] ABSTRACT

A self-propelled forager can accumulate dust, dirt or crop material particles in its maintenance and/or engine compartment. To avoid such accumulations, suction devices are provided in the engine and/or maintenance compartment which extract dust, dirt or crop material particles. The suction is provided by the post-accelerator which conveys the chopped crop.

9 Claims, 2 Drawing Sheets

DEVICE FOR EXTRACTING FOREIGN OBJECTS FROM FORAGER HARVESTERS

BACKGROUND OF THE INVENTION

The present invention relates generally to agricultural machinery and, more particularly, to improvements to forager harvesters for chopping agricultural crops.

A self-propelled forager or forage harvester generally has a frame, chassis, engine, a chopper drum, a conveying channel mounted behind with a post-accelerator arranged therein, and a rotating screening device which is mounted in front of the radiator and which is brushed with a dust-removing suction housing.

A similar forager is shown in European Patent 0 481 203. During operation, the engine compartment as well as the maintenance compartment of the self-propelled forager are covered with dust particles which settle therein. The term "dust particles" includes, for example, dirt and chaff. Also, dust particles invade the cooling air drawn in for the engine. Under adverse wind conditions, dirt particles or chopped crop material particles also can be blown into the maintenance and engine compartments. Furthermore, while traveling, both the self-propelled forager and equipment traveling alongside, such as tractors with trailers into which the chopped material is blown, throw up dust which collects in the engine and maintenance compartments. The problem can arise in particular when the engine compartment and the maintenance compartment have openings at the top or on at least one side. Accumulation of dust is undesirable because it hinders maintenance work in the maintenance compartment. Also, there can be a risk of fire in the engine compartment due to accumulations of chaff and other remains of dry crop material. In particular, there is a danger of the ignition of accumulated crop material by heat from the engine or its exhaust pipes. Further, the ignited crop materials may fall onto the field and set the whole field on fire.

It is an object of the present invention to prevent the accumulation of dust, dirt and crop material particles in the engine and/or maintenance compartment of an agricultural machine to the greatest extent possible.

SUMMARY OF THE INVENTION

In accordance with the present invention there is provided a forager having a chassis, an engine compartment and a second compartment on the chassis, an engine in the engine compartment and having a radiator, a chopper unit on the chassis, a conveying channel mounted behind the chopper unit, a post-accelerator in the conveying channel, a rotating screening device in the second compartment and located in front of the radiator, a suction housing associated with the rotating screening device for removing dust particles therefrom, and means at the bottom of at least one of the compartments for extracting dust particles which settle in the compartment.

The embodiment of the invention makes it possible to extract dust, dirt and crop material particles as they accumulate before larger accumulations form. As a result maintenance work is not hindered by the accumulation of such particles. Furthermore, the remains of crop material are less likely to danger the machine or the field being harvested.

BRIEF DESCRIPTION OF THE DRAWINGS

Referring now to the drawings, an embodiment of the invention will be described.

DETAILED DESCRIPTION

Figure 1:
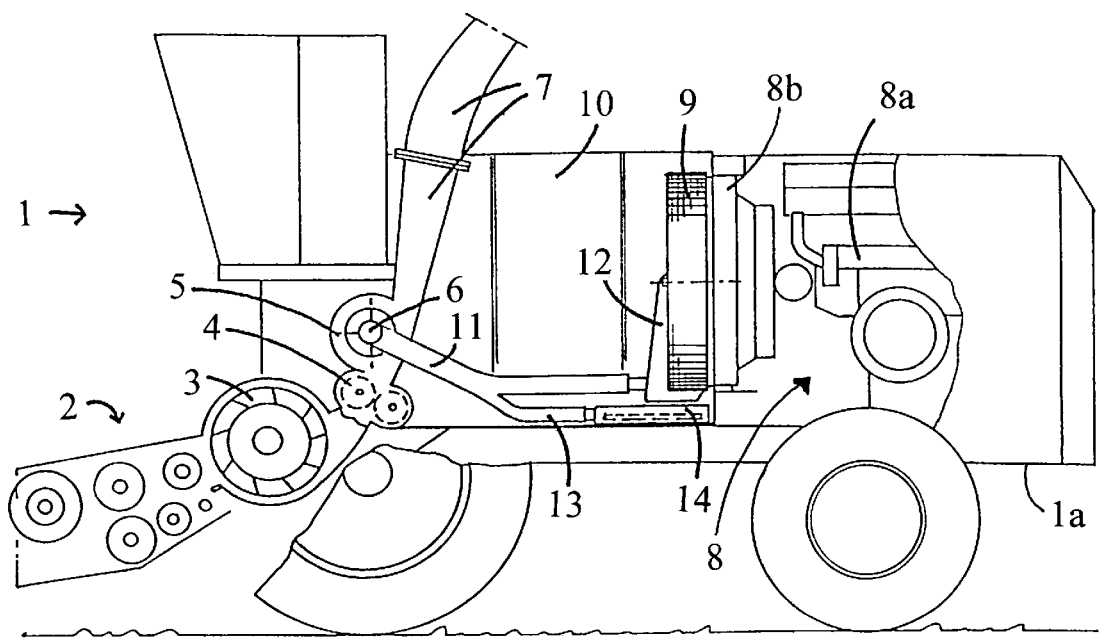
FIG. 1 is a schematic side view of a self-propelled forager with some of its side panels removed for better illustration of the parts.

FIG. 1 shows a self-propelled forager 1 having a chassis 1a including a frame and wheels, and an engine 8a in an engine compartment 8. Front material intake members 2 which adjoined by a chopping unit 3. Behind the chopping unit 3, in the direction of travel of the forager 1, is a treatment unit shown as a pair of rollers 4 which crush the chopped material. The rollers 4 transfer the crushed chopped material to a post-accelerator 6, which conveniently includes rotating paddles 5. The post-accelerator 6 throws the crop material outward through a discharge chute 7 and into a transport, such as a truck or wagon (not shown), traveling in parallel alongside the forager 1 or attached to it. Adjacent the engine 8a and inside the engine compartment 8 is a radiator 8b for cooling the engine. In front of the radiator 8b is a rotating screening device 9 which is arranged in a maintenance compartment 10.

Figure 3:
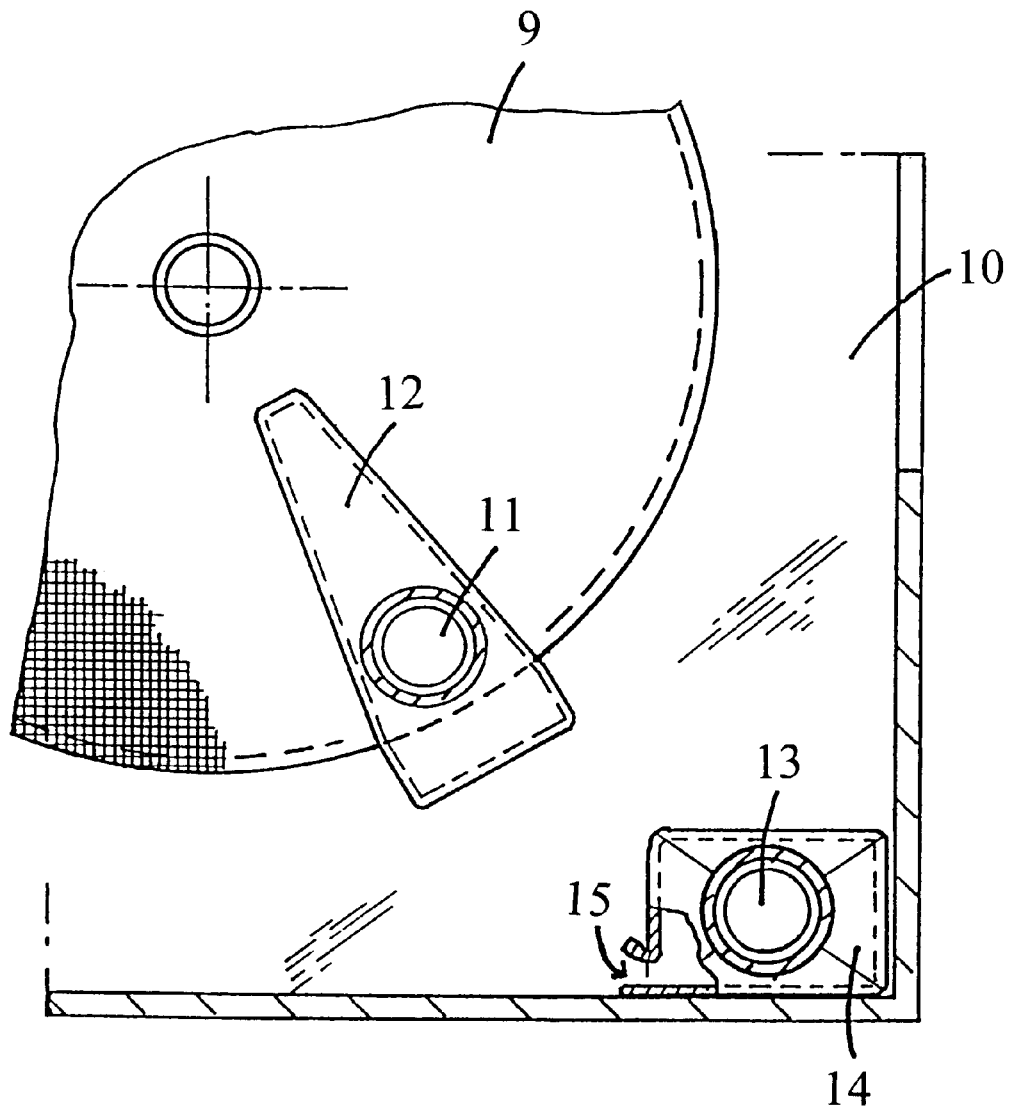
FIG. 3 is a partial cross-sectional view taken generally along line III—III in FIG. 2.

Connected to the suction side of the post-accelerator 6 is a pipe 11 which carries the partial vacuum caused by the suction. The pipe 11 leads to a suction housing 12 at the rotating screening device 9. The open side of the housing 12 brushes a portion of the end face of the rotating screening device 9 and in this way extracts dust, chaff, etc. from the outer surface thereof. Pipe 11 has a branch pipe 13 which leads to a suction box 14 advantageously arranged on the bottom of the maintenance compartment 10. As seen in FIG. 3, the suction box 14 has a lower inlet slot 15. This arrangement effectively keeps the bottom of the maintenance compartment 10 free of remains of crop material, dust and other impurities.

Figure 2:
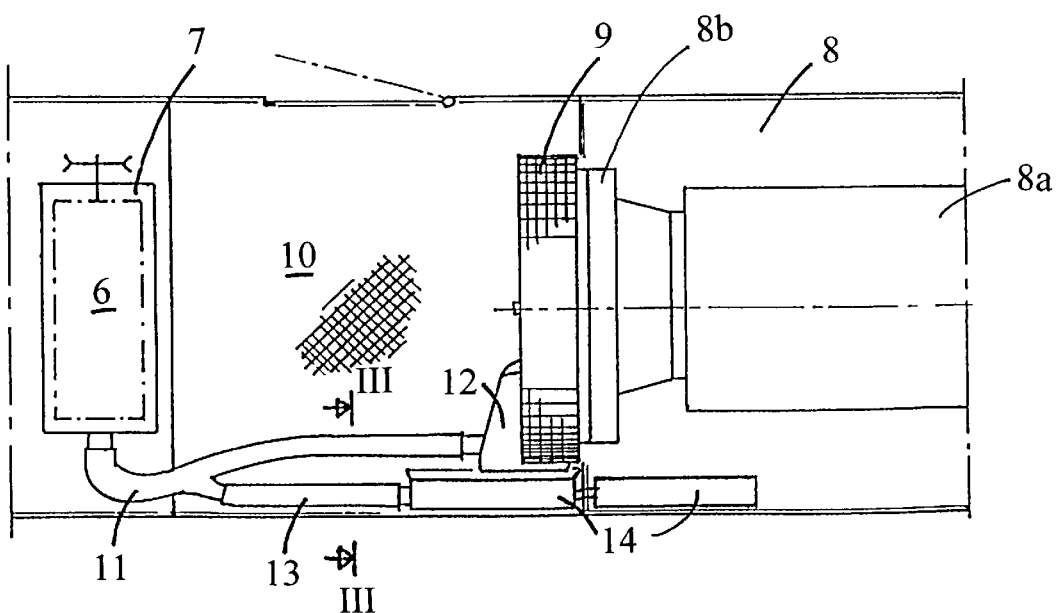
FIG. 2 is a schematic partial top view of the machine shown in FIG. 1.

As shown in FIG. 2, one or more suction boxes 14 can additionally or alternatively be arranged in the engine compartment 8. Instead of the advantageous construction of suction box 14 shown in FIG. 3, one or more perforated hoses or suction nozzles connected to one or more pipes 13 can be arranged in the compartment 8 or 10. Hence, the term "suction inlet" should be taken to include suction housing 12, suction boxes 14, perforated hoses, suction nozzles, and the like. Likewise, the term "pipe" includes hoses, conduits and the like capable of carrying a partial vacuum.

Other objects, features and advantages will be apparent to those skilled in the art. While preferred embodiments of the present invention have been illustrated and described, this has been by way of illustration and the invention should not be limited except as required by the scope of the appended claims.

We claim:

1. A self-propelled forager having a chassis, an engine compartment and a second compartment on the chassis, an engine in the engine compartment and having a radiator, a chopper unit on the chassis, a conveying channel mounted behind the chopper unit, a post-accelerator in the conveying channel, a rotating screening device in the second compartment and located in front of the radiator, a suction housing associated with the rotating screening device for removing dust particles therefrom, and means at the bottom of at least one of the compartments for extracting dust particles which settle in the compartment.

2. A forager according to claim 1, wherein said means for extracting is arranged at least in the engine compartment.

3. A forager according to claim 1, wherein said means for extraction is operatively connected to the suction housing of the rotating screening device.

4. A forager according to claim 1, wherein said means for extraction includes a suction inlet.

5. A forager according to claim 1, wherein said means for extraction includes a suction box arranged at the bottom of the second compartment, and a pipe under partial vacuum; and wherein the suction box is provided with an inlet slot.

6. A forager according to claim 5, wherein said pipe includes first and second branch pipes, one of which is connected to the suction box and the other to the suction housing associated with the rotating screening device.

7. A forager according to claim 1, wherein the means for extracting is arranged at least in said second compartment.

8. A forager according to claim 1, wherein the means for extracting includes at least one suction inlet and a pipe operatively connected to the suction inlet.

9. In a self-propelled forager having a chassis, an engine compartment and a maintenance compartment on the chassis, an engine in the engine compartment and having a radiator, a chopper unit on the chassis, a conveying channel mounted behind the chopper unit, a post-accelerator in the conveying channel, a rotating screening device in the maintenance compartment and located in front of the radiator, and a suction housing associated with the rotating screening device for removing dust particles therefrom, the improvement comprising:

suction means including inlet means at the bottom of at least one of the compartments for extracting remains of crop material and other like impurities which settle in the compartment.

* * * * *